(12) United States Patent
Viaud et al.

(10) Patent No.: US 6,782,680 B2
(45) Date of Patent: Aug. 31, 2004

(54) AGRICULTURAL MACHINE

(75) Inventors: Jean Viaud, Gray (FR); Lionel Guiet, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/438,128

(22) Filed: May 14, 2003

(65) Prior Publication Data
US 2003/0230066 A1 Dec. 18, 2003

(30) Foreign Application Priority Data
May 23, 2002 (DE) .......................... 102 22 706

(51) Int. Cl.⁷ .......................................... A01D 35/264
(52) U.S. Cl. .......................... 56/13.6; 56/15.8; 56/208
(58) Field of Search .................. 56/13.6, 15.7–15.9, 56/15.1, 208–228; 172/395, 396, 419, 427; 180/6.62–6.64, 6.24; 280/1, 3, 29

(56) References Cited

U.S. PATENT DOCUMENTS

| | | | | |
|---|---|---|---|---|
| 4,176,721 A | | 12/1979 | Poggemiller et al. | ......... 172/4 |
| 4,177,625 A | * | 12/1979 | Knight et al. | ................ 56/13.6 |
| 4,676,053 A | * | 6/1987 | Pruitt | .......................... 56/208 |
| 5,337,544 A | * | 8/1994 | Lauritsen | .................... 56/15.7 |
| 5,806,291 A | * | 9/1998 | Lehman et al. | ............. 56/15.2 |
| 6,250,055 B1 | * | 6/2001 | Franet | ....................... 56/15.9 |

FOREIGN PATENT DOCUMENTS

| | | |
|---|---|---|
| DE | 31 39 936 | 4/1983 |
| EP | 1 201 470 | 5/2002 |
| FR | 2 725 340 | 4/1996 |

OTHER PUBLICATIONS

Deere & Co., "The Furrow", Nov. 2001, p. 20.

* cited by examiner

Primary Examiner—Robert E. Pezzuto

(57) ABSTRACT

An agricultural machine includes a wheel at each end of a transverse main frame with each wheel being carried by a vertically pivotal link to which an extensible and retractable actuating device is coupled for effecting vertical adjustment of the frame relative to the ground. The upper end of each actuating device is attached to a further link which is vertically pivotally mounted to the frame and has its upward movement resisted by a frame-mounted spring so as to dampen forces imposed on the wheel by the terrain. Each further link may be selectively locked to the frame so as to eliminate the function of the associated spring.

5 Claims, 1 Drawing Sheet

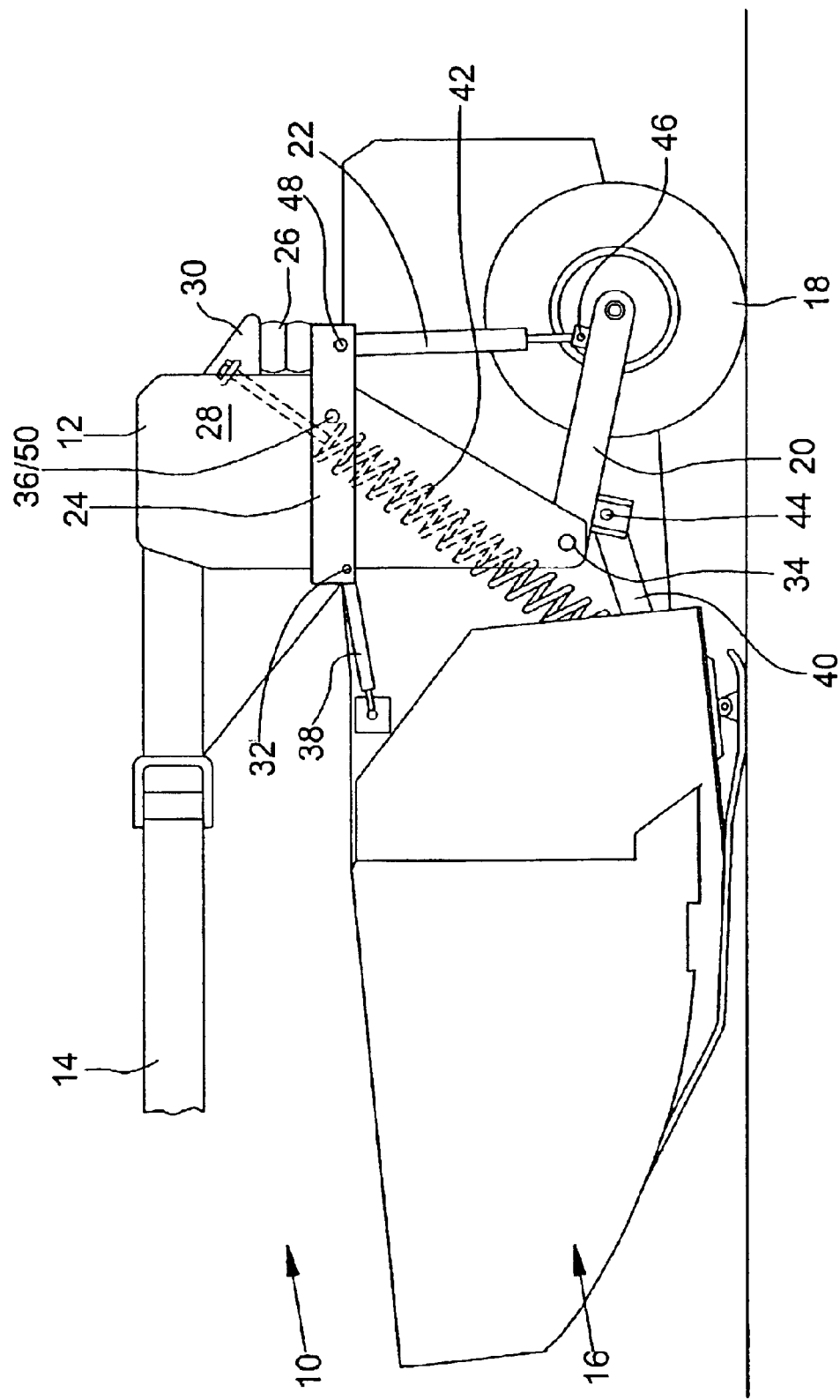

AGRICULTURAL MACHINE

FIELD OF THE INVENTION

The invention concerns an agricultural machine, particularly a mower, with a frame and wheels where each of the wheels is connected by a link to the frame, so as to pivot vertically, and the position of the link can be varied by means of an actuating device, one end of which engages the link.

BACKGROUND OF THE INVENTION

The November 2001 issue of the magazine, "The Furrow", page 20, shows a rotary mower with several wheels that are connected by means of links to arms of a positioning frame. The positioning frame is repositioned by means of a hydraulic motor in order thereby to position the operating height of the rotary mower. Each link is attached approximately at its center, free to pivot to the particular arm, and carries at one end one or two wheels and at the other end a spring that is supported on the arm.

The problem underlying the invention is seen in the need to support, on springs, other agricultural machines in which an actuating device operates directly on the link in the same simple way.

SUMMARY OF THE INVENTION

According to the present invention, there is provided an improved wheel mounting arrangement for an agricultural implement.

An object of the invention is to provide a simple wheel mounting that preserves a known wheel mounting arrangement, but provides dampening of loads imposed on the wheel by the terrain and the like.

This object is accomplished by using, in combination with a conventional configuration wherein a trailing wheel support arm or link is supported on the frame by means of an actuating device, a further spring loaded link inserted between an end of the actuator and the implement frame. This results in only a minimal added cost for the frame, while the actuating device is merely connected at another location. Although this configuration is applied predominately to mowers, with or without conditioners, its application to sowing machines, ground breaking machines, grubbers, and the like is also conceivable.

Springs may be of any conventional configuration, that is, in particular such made of rubber, polyurethane or metal. Depending on the material and the connection of the spring to the further link, the spring can be loaded either in compression or tension. Nevertheless, an excessive deflection should be avoided since this could lead to an uncontrolled behavior in operation of the agricultural machine during rapid operation on very uneven ground.

An example of a spring having suitable characteristics is a pneumatic reservoir spring. In particular, it has the advantage that its spring force and deflection path can be controlled.

If the further link can be secured to the implement frame, the operation of the spring can be deactivated, for example, during operation on the field, and again activated for rapid operation on public roads.

BRIEF DESCRIPTION OF THE DRAWINGS

The sole FIGURE of the drawing is a left side elevational view of a towed implement embodying an embodiment of the present invention.

DESCRIPTION OF THE PREFERRED EMBODIMENT

Preliminarily, it is to be noted that the drawing only shows one of each of several components that are described as occurring in pairs, with it to be understood that the component not shown is identical to or a right-hand version of the component that is shown.

An agricultural machine 10 shown in the drawing includes a main frame 12, a towbar 14, and an operating unit 16, and pairs of wheels 18, links 20, actuating devices 22, further links 24, and springs 26.

The agricultural machine 10 is shown as a so-called mower-conditioner which mows crop to be harvested that is standing on the ground, processes it, and deposits it again on the ground, and at the same time, is towed behind a towing vehicle, not shown. Other towed agricultural machines 10, that can be repositioned in their operating height, could also be used.

As seen in the direction of operation, the frame 12 has the approximate shape of an inverted "U". A block 30 is attached, for example, by welding to the rear side of each leg 28 of the frame 12. Spaced below and forwardly of each block 30 is a joint 32. A bearing 34 is located in the lower end region of each leg 28. Between the block 30 and the joint 32, the leg 28 is penetrated by a bore 36.

The towbar 14 is used to connect the frame 12 to the towing vehicle and is attached to the front side of the frame 12, so as to pivot horizontally, which however, is not explained in any further detail since it is sufficiently known.

In the present embodiment, the operating unit 16 is formed by a mower-conditioner unit that is suspended from frame 12 by upper and lower steering arms 38 and 40, so as to pivot vertically, and has its weight counterbalanced by springs 42 so that during operation, only a slight weight is supported by the ground-engaging skids carried by the operating unit 16. The operating height of the operating unit 16 is controlled by the position of the links 20. Otherwise, this operating unit 16 is also of a known configuration.

On each leg 28 of the frame 12, a wheel 18, a link 20, an actuating device 22, a further link 24, and a spring 26 are provided. The further description refers only to the left side of the agricultural machine 10, as is visible in the drawing.

Each wheel 18 is located in the rear region of the operating unit 16 and engages, free to rotate, the particular link 20.

At its rear region, the link 20 carries the wheel 18, free to rotate, and engages with its forward end region, free to pivot vertically, the bearing 34 of the leg 28. On the underside of the link 20 in its forward end region, a bearing 44 is provided for the connection with the lower steering arm 40. On the upper side of, and near a rear end region of the link 20, there is provided a bearing 46 to which is attached a lower end of the actuating device 22.

In this embodiment, the actuating device 22 is formed by a hydraulic motor including a piston rod and cylinder extending essentially in the vertical direction, with the rod being coupled at bearing 46 on the link 20. A repositioning of the length of the actuating device 22 has the effect of changing the operating height of the agricultural machine 10.

The further or upper link 24 is formed in an approximate "U" shape and overlaps, like a fork, the leg 28 in the horizontal direction. The forward end region of the link 24 is connected to the frame 12 together with the upper steering arm 38 in the joint 32, so as to pivot vertically. The rear end region of the upper link 24 is connected in a joint in a bearing 48 with the upper end region of the cylinder of the actuating device 22. Between the joint 32 and the bearing 48, the link 24 is provided with a bore 50 that can be brought into alignment with the bore 36 in the leg 28 for the purpose of receiving a locking pin.

In the preferred embodiment, the spring 26 is made of polyurethane and formed into a block into which a threaded sleeve, not visible in the drawing, is integrated. With its upper side, the spring 26 is in contact with the underside of the block 30 and is secured to it by means of a screw inserted into the threaded sleeve. The underside of the spring 26 is in contact with the upper side of the further link 24. The spring 26 is used as a damping member or shock absorber in order to protect the frame 12 and the agricultural machine 10 from shocks.

On the basis of the above description, the further link 24 can pivot vertically about the joint 32 against the force of the spring 26, so that if necessary, shocks transmitted over the wheels 18, the link 20, and the actuating device 22 can be mitigated by the spring 26.

If the spring function is not to be activated, the aforementioned pin is inserted through the bores 36 and 50 so that the further link 24 can no longer pivot.

Having described the preferred embodiment, it will become apparent that various modifications can be made without departing from the scope of the invention as defined in the accompanying claims.

What is claimed is:

1. In an agricultural machine, including a frame having a central section extending transverse to a normal direction of travel and having opposite ends respectively joined to upright legs, a wheel-support link coupled to each leg for pivoting vertically, a wheel rotatably mounted to each wheel-support link, and an extensible and retractable actuating device being coupled between said frame and each wheel-support link for selectively adjusting the associated wheel-support link, the improvement, comprising: each actuating device being coupled to said frame by a further link vertically pivotally coupled to said frame and pivotally coupled to the actuating device at a location spaced from the connection between the further link and the frame; and a spring being coupled between each further link and said frame and resisting upward pivoting movement of said further link.

2. The agricultural machine, as defined in claim 1, wherein each spring is formed of one of rubber, polyurethane or metal.

3. The agricultural machine, as defined in claim 1, wherein said spring is a pneumatic reservoir spring mounted for being compressed by upward pivoting movement of an adjacent one of said further links.

4. The agricultural machine, as defined in claim 1, wherein each further link is U-shaped and has opposite legs disposed on opposite sides of an associated one of the legs of said frame.

5. The agricultural machine, as defined in claim 1, and further including a lock for selectively securing each further link to said frame so as to remove the operation of the associated springs.

* * * * *